United States Patent
Pommer et al.

(10) Patent No.: US 9,442,255 B2
(45) Date of Patent: Sep. 13, 2016

(54) LOW PROFILE FIBER-TO-MODULE INTERFACE WITH RELAXED ALIGNMENT TOLERANCES

(75) Inventors: Richard J. Pommer, Carlsbad, CA (US); George F. Ahadian, San Marcos, CA (US); Charles B. Kuznia, Encinitas, CA (US); Richard T. Hagan, Mission Viejo, CA (US)

(73) Assignee: ULTRA COMMUNICATIONS, INC., Vista, CA (US)

(*) Notice: Subject to any disclaimer, the term of this patent is extended or adjusted under 35 U.S.C. 154(b) by 350 days.

(21) Appl. No.: 13/807,591

(22) PCT Filed: Jun. 29, 2011

(86) PCT No.: PCT/US2011/042418
§ 371 (c)(1),
(2), (4) Date: Mar. 18, 2013

(87) PCT Pub. No.: WO2012/006176
PCT Pub. Date: Jan. 12, 2012

(65) Prior Publication Data
US 2013/0209038 A1     Aug. 15, 2013

Related U.S. Application Data

(60) Provisional application No. 61/359,684, filed on Jun. 29, 2010.

(51) Int. Cl.
*G02B 6/36* (2006.01)
*G02B 6/42* (2006.01)

(52) U.S. Cl.
CPC .................. *G02B 6/36* (2013.01); *G02B 6/424* (2013.01); *G02B 6/4245* (2013.01); *G02B 6/4292* (2013.01); *G02B 6/4214* (2013.01); *G02B 6/4248* (2013.01); *Y10T 29/49* (2015.01); *Y10T 29/49826* (2015.01)

(58) Field of Classification Search
CPC ...... G02B 6/36; G02B 6/424; G02B 6/4214; G02B 6/4245; G02B 6/4248; G02B 6/4292; Y10T 29/49; Y10T 29/49826
USPC .............. 385/14, 76–78, 88–92; 29/428, 592
See application file for complete search history.

(56) References Cited

U.S. PATENT DOCUMENTS

| | | | | |
|---|---|---|---|---|
| 6,071,016 A * | 6/2000 | Ichino | .................. | G02B 6/4204 385/92 |
| 7,004,644 B1 * | 2/2006 | Johnson | ............... | G02B 6/4204 257/680 |
| 7,118,293 B2 * | 10/2006 | Nagasaka | ............ | G02B 6/4292 385/89 |
| 2006/0215963 A1 * | 9/2006 | Hamano | .................. | G02B 6/30 385/49 |
| 2008/0277769 A1 * | 11/2008 | Cotte | ...................... | H01L 23/04 257/659 |

* cited by examiner

*Primary Examiner* — Akm Enayet Ullah
*Assistant Examiner* — Michael Mooney
(74) *Attorney, Agent, or Firm* — Jonathan A. Kidney; TechLaw LLP

(57) ABSTRACT

Systems and methods are described for creating a very cost effective optical/electrical interface connecting system with high tolerance to misalignment. Low cost sealed optical devices can be fabricated with easily detachable top cable assemblies. This approach can be used for hermetically sealed optical devices without the need for hermetic fiber feed-through. The system also has features that enable fiber optic components to operate and survive in harsh environments, particularly in large temperature extremes.

24 Claims, 15 Drawing Sheets

LOW PROFILE FIBER-TO-MODULE INTERFACE WITH RELAXED ALIGNMENT TOLERANCES

CROSS REFERENCE TO RELATED APPLICATION(S)

This application is a U.S. National Stage Filing under 35 U.S.C. 371 from International Patent Application PCT/US11/42418, filed Jun. 29, 2011, and published on Jan. 12, 2012 as WO 2012/006176 A1, which claims the benefit of U.S. Provisional Patent Application No. 61/359,684, titled "Low Profile Fiber-to-Module Interface with Relaxed Alignment Tolerances", filed Jun. 29, 2010, the contents of which are hereby incorporated by reference in their entireties.

FEDERALLY-SPONSORED RESEARCH AND DEVELOPMENT

This disclosure was made with Goverment support under Air Force Contract FA9453-10-C-0018 awarded by the United States Air Force. The Government may have certain rights.

FIELD

This subject matter relates to the field of fiber optics. More particularly, it relates to fiber optic devices with simplified optical path alignment capabilities.

BACKGROUND

Fiber optics offer high data rate, low weight and electromagnetic interference immunity for data communications, making it suitable as a communication channel for use in modern aircraft, helicopters, unmanned avionic vehicles, space-craft and missiles, etc. These platforms require sensor and control data to be distributed throughout the system. In addition to high performance capabilities, these fiber optic components must be able to survive in these platform-environments. Additionally, due to size constraints, fiber optic components must be made in compact packages to fit within strictly defined physical envelopes.

Due to the harshness of these platform-environments, fiber optic components may become damaged. One approach to avoid damage is to fabricate the fiber optic components with a "fixed pigtail"—a short run of optical fiber that is permanently attached to the component. Typically, the fixed pigtail passes through a hermetically sealed can which contains the electronic and optoelectronic (OE) devices (e.g., integrated circuits, PIN detectors, lasers, and LEDs, etc.).

The process of making a hermetic pass-thru of the fiber is expensive, consumes considerable package volume, and is not compatible with re-work. Also, some fiber components use a ribbon made up of multiple fibers (typically twelve) which further increase the difficulties as the process of sealing the ribbon fiber feed-thru is much more difficult and expensive than a single fiber.

Fiber optic strands are lightweight, but they are also fragile so that the pigtail can be easily damaged. For example, they can be damaged in the process of manufacturing the component, in the process of fielding the component, or in the process of operating the component in the field. If the fiber pigtail is damaged, the fiber can be cut and re-connectorized, or in some cases it can be "fused" back together. This requires the component to be removed from the system and the repair work done at a specialized facility. This process is only possible if the damage to the fiber is some distance from the component. It is not possible to fix damage that occurs near the components, since some run of fiber must be available for re-connectorizing and/or fusing. In many cases the fiber cannot be repaired and the entire, fiber optic component must be replaced.

Additionally, the fiber optic connectors are typically not compatible with a solder reflow process. Therefore, if another component on a printed wiring board needs to be replaced, the fiber optic component must be removed prior to solder re-work. This additional handling of the fiber optic component also exposes the fiber pigtail to damage.

In view of the above deficiencies in the art, new systems and methods are detailed below for providing a fiber optic interface that can be easily re-worked or connectorized, avoiding the cost and inconvenience of fiber pigtail damage. Additionally, these systems and methods allow the pigtail to be easily attached and removed from the fiber optic component without disrupting the hermetic seal of the electronic and OE devices.

SUMMARY

The following presents a simplified summary in order to provide a basic understanding of some aspects of the claimed subject matter. This summary is not an extensive overview, and is not intended to identity key/critical elements or to delineate the scope of the claimed subject matter. Its purpose is to present some concepts in a simplified form as a prelude to the more detailed description that is presented later.

In one aspect of the present disclosure, a method for aligning and maintaining precise alignment of a cable assembly of a fiber optical line to an optical core assembly of an opto-electric (OE) device is provided, comprising: fabricating a keying feature at a bottom of the cable assembly; fabricating a mating keying feature at a top of the core assembly, wherein the bottom and top keying features, when mated, align an optical path in the cable assembly with an optical path in the core assembly; and bonding at least one of a lens alignment feature on a lens in the core assembly and a carrier alignment feature on a transparent carrier disposed between the lens and the OE device, wherein the lens and carrier alignment features, when aligned, align an optical path in the lens to the OE device.

Other aspects of the above method include modifications, wherein the bonding of the alignment features is accomplished via a flip-chip bonding process; the optical path in the cable assembly is bent approximately 90 degrees in the cable assembly; the lens alignment feature is bonded to a bottom of the lens; the carrier alignment feature is bonded to a bottom of the transparent carrier; the keying features, when mated, allow an alignment error of up to 25 microns; the alignment features, when aligned, allow an alignment error of up to 5 microns; removably attaching the cable assembly to the core assembly; disposing a transparent spacer between the lens and the transparent carrier; fabricating thermal vias below the OE device, to assist in cooling the OE device; disposing an active cooler proximal to the OE device, to assist in cooling the OE device; and sealing the core assembly in a hermetic can.

In another aspect of the disclosure, a method for aligning and maintaining precise alignment of a cable assembly of a fiber optical line to an optical core assembly of an opto-electric (OE) device is provided, comprising: illuminating a bottom portion in an optical path of the cable assembly with a first optical beam: illuminating a top portion in an optical path of a package window with a second optical beam, wherein the package window is disposed between the cable assembly and a lens in the core assembly; and aligning the illuminated bottom and top portions to align the optical path in the cable assembly with the optical path in the core assembly.

Other aspects of the above method include modifications, wherein the illuminated bottom and top portions comprise frosted surfaces; and art adhesive is applied to the frosted portions.

In yet another aspect of the disclosure, a method for aligning and maintaining precise alignment of a cable assembly of a fiber optical line to an optical core assembly of an opto-electric (OE) device is provided, comprising: fabricating a first keying feature at a bottom of the cable assembly; fabricating a mating first keying feature at a top of a package window disposed between the cable assembly and a lens in the core assembly, wherein the first keying feature and mating keying feature, when mated, align the optical path in the cable assembly with an optical path in the package window; fabricating a second keying feature at a top of the lens; and fabricating a mating second keying feature at a bottom of the package window, wherein the second keying feature and mating second keying feature, when mated, align the optical path in the package window with an optical path in the lens.

Other aspects of the above method include modifications, wherein the keying features are laser-etched; and all of the keying features, when mated, allow an alignment error of up to 25 microns.

In another aspect of the disclosure, a method for aligning and maintaining precise alignment of a cable assembly of a fiber optical line to an optical core assembly of an opto-electric (OE) device is provided, comprising: fabricating a keying feature at a bottom of the cable assembly; and fabricating a mating keying feature at a top of an alignment frame disposed between the cable assembly and a package window over a lens and transparent carrier in the core assembly, wherein the keying feature and mating keying feature, when mated, align an optical path in the cable assembly into the OE device.

In yet another aspect of the disclosure, an optical core assembly adapted to precisely match an optical cable assembly is provided, comprising: a collimating lens configured with a keying feature at a top of the lens and a bottom-alignment feature at a bottom of the lens, the keying feature capable of being matched to a mating keying feature in the cable assembly to provide fix an optical path in the cable assembly to the lens: a transparent carrier with carrier-alignment features, disposed below the lens; and an opto-electric (OE) device disposed below the transparent carrier, wherein the bottom- and carrier-alignment features provide alignment of the optical path to the OE device.

Other aspects of the above device include modifications, wherein a corner turn optics is disposed in the cable assembly; the keying features, when mated, allow an alignment error of up to 25 microns; the bottom- and carrier-alignment features, when aligned, show an alignment error of on to 5 microns; and a transparent spacer disposed between the lens and the transparent carrier.

In another aspect of the disclosure, an optical core assembly adapted to precisely match an optical cable assembly is provided, comprising: a frosted portion in an optical path of a bottom of the cable assembly; and a frosted portion in an optical path of a top of a package window disposed below the cable assembly; a lens in the core assembly, wherein the frosted portions, when aligned, align the optical path in the cable assembly with the optical path in the core assembly.

In yet another aspect of the disclosure, an optical core assembly adapted to precisely match an optical cable assembly is provided, comprising: a first keying feature at a bottom of the cable assembly; a mating first keying feature at a top of a package window disposed between the cable assembly and a lens in the core assembly, wherein the first keying feature and mating first keying feature, when mated, align the optical path in the cable assembly with an optical path in the package window; a second keying feature at a top of the lens; and a mating second keying feature at a bottom of the package window, wherein the second keying feature and mating keying feature, when mated, align the optical path in the package window with an optical path in the lens.

In yet another aspect of the disclosure, an optical core assembly adapted to precisely match an optical cable assembly is provided, comprising: an alignment frame with a keying feature disposed below the cable assembly, a mating keying feature at a bottom of the cable assembly; a package window disposed below the alignment frame; a lens and transparent carrier disposed below the package window: and an opto-electric (OE) device disposed below the transparent carrier, wherein the keying feature and mating keying feature, when mated, align an optical path in the cable assembly into the OE device.

Other aspects of the above device include modifications, wherein a can with a sealed lid is disposed about the core assembly; thermal vias are below the OE device, to assist in cooling the OE device; an active cooler is proximal to the OE device, to assist in cooling the OE device; a securing member is disposed above and in contact with the cable assembly; the securing member is a spring; and a corner turn optics is disposed in the cable assembly.

In another aspect of the disclosure, a method for aligning and maintaining precise alignment of a cable assembly of a fiber optical line to an optical core assembly of an opto-electric (OE) device is provided, comprising: fabricating a keying feature at a bottom of the cable assembly; fabricating a mating, keying feature at a top of the core assembly, wherein the bottom and top keying features, when mated, align an optical path in the cable assembly with an optical path in the core assembly: bonding at least one of a lens alignment feature on a lens in the core assembly: and aligning the OE device with the lens alignment features to align an optical path in the lens to the OE device.

BRIEF DESCRIPTION OE THE DRAWINGS

FIGS. 1-1A are a cut-away illustration and sectional blowup of an exemplary two-part lens system having a CORE and a top cable assembly, with keying/alignment features.

DETAILED DESCRIPTION

Figure 1:
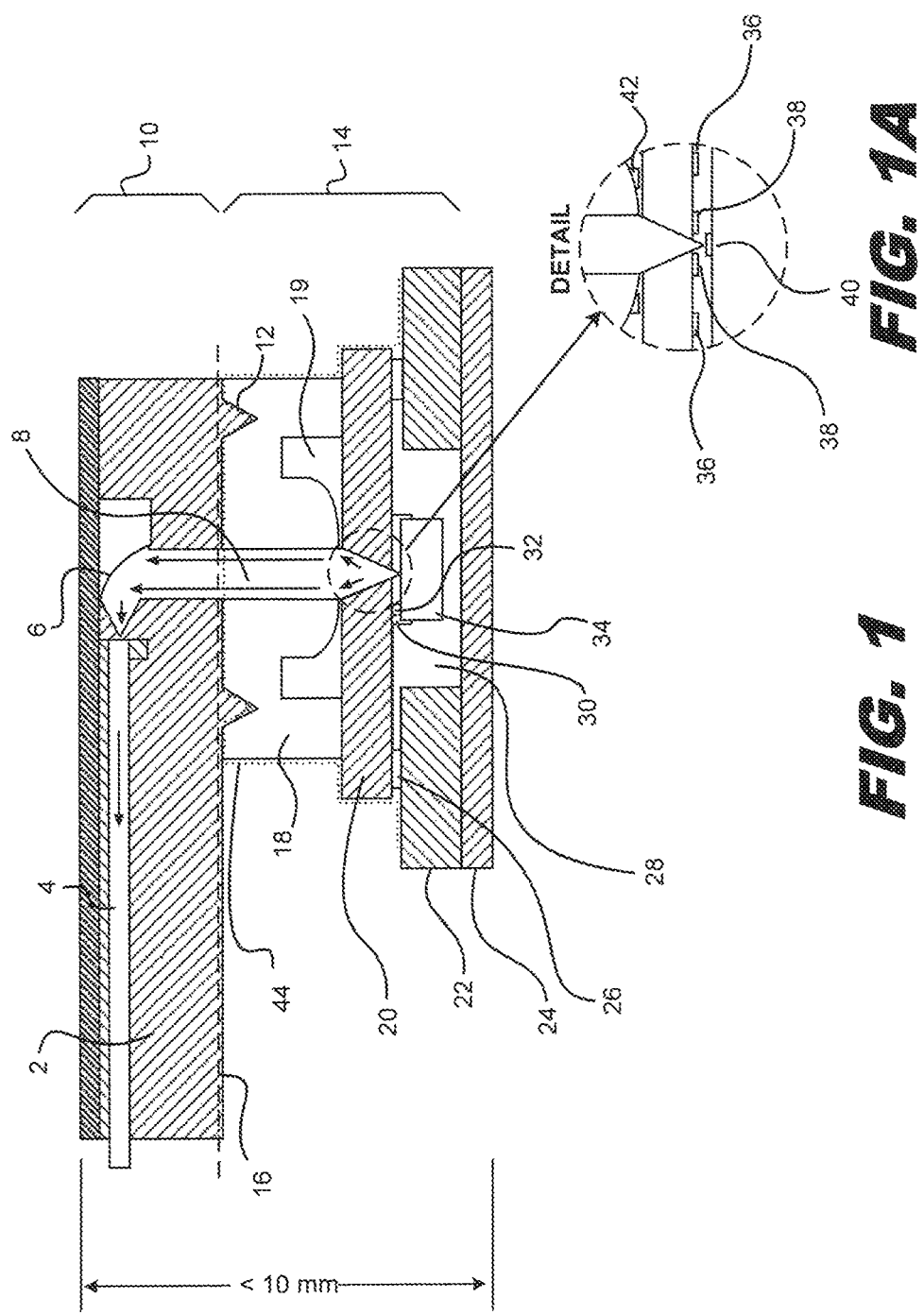

This application incorporates by reference the subject matter of U.S. Pat. No. 5,815,619 to Bloom, titled "Fiber Optic Connector Hermetically Terminated" and U.S. Pat. No. 6,445,867 to Gilliland et, al., titled "Optical Fiber Hermetic Termination Connector."

Maintaining the alignment of OE devices, lenses and the optical fiber in a non-temperature controlled environment is challenging. The OE devices are typically formed in an III-V material with a coefficient of thermal expansion (CTE) below 6 ppm/C. The lenses that couple light between the OE devices and fibers are typically molded in a plastic material with a CTE above 30 ppm/C. This large difference in CTE causes difficulties in maintaining alignment over varying temperature. One method of accommodating the CTE mismatch is to use a two-lens approach: one lens fabricated in material close to the CTE of the OE devices and precisely aligned to the OE device, and a second lens fabricated in a material close to the CTE of the material holding the fiber and precisely aligned to the fiber. The same material can be used to hold the fiber and form the lens. This lens system forms a 'collimated' or 'expanded' beam interface that is tolerant to misalignment.

However, the alignment problem is more severe in fiber optic components that utilize multiple, parallel channels. As some OE devices are typically formed as an array, the lens system must couple an array of OE devices to an array of fibers, using an array of lenses. Maintaining alignment of these arrays of devices is known to be more difficult than in single channel fiber optic components.

However, as detailed below, a compact, rugged fiber optic component addressing the deficiencies of the current state-of-the-art can be manufactured. That is, a process using flip-chip bonding techniques (as one possible non-limiting example) can function in facilitate the key optical alignment steps that have been hereunto difficult to accomplish. For example, alignment features using a flip-chip bonder with sub-micron placement accuracy can be implemented for the following assembly steps: 1) Laser and PIN array bonding in a transparent carrier; 2) transparent carrier bonding to a ceramic carrier substrate; and 3) lens bonding to the transparent carrier. Thus, with the application of "flip-chip" bonding techniques, components can be precisely packaged within small, ruggedized packages with connectorized or fixed pigtails. Various details of the application of the "flip-chip" bonding technique(s) are presented in the FIGS. below.

Additionally, in various embodiments, the exemplary systems provide for the creation of fiber optic modules that can be hermetically sealed and have a pigtail that can be connectorized or replaced with a simple process. Thus, hermetic feed-thrus can be avoided, and their attendant problems. This exemplary system(s) also can use an optical core, (CORE) sub-assembly designed for high-reliability applications. The CORE contains the exemplary precision alignment features, assembly of OE devices, integrated circuitry and lens devices and is coupled to a carrier containing wire-bond pads or other standard electrical interface. In some embodiments, the CORE can generally comprise the lens and optical interfaces, supporting substrate, and OE device(s). The CORE eases assembly requirements for incorporation into a fiber optic module by providing a wire-bondable electrical interface and an optical interface with relaxed alignment tolerances.

The exemplary fiber optic module can be manufactured using a process flow of five possible steps: 1) CORE assembly using precision flip-chip bonding steps which makes the critical alignment of the OE devices to lenses; 2) module substrate assembly, which includes populating a substrate with passive and/or active electrical components, lead frame interconnect and mechanical structures for supporting a lid; 3) module assembly, including bonding (or wire, or ribbon bonding, or flip-chip attach) of the optical core into the substrate; 4) sealing the module; and 5) attaching a top cable assembly (the top cable assembly contains lenses precisely aligned with the fibers and enables a method for turning the light approximately 90 degrees). In some embodiments, the CORE may additionally comprise one or more OE devices, transparent substrate/spacer, one or more lenses, and optionally an interposer.

The exemplary system(s) enables the use of alignment marks, for example, on a transparent substrate to allow alignment of the lasers (including vertical cavity surface emitting lasers—VCSELs) to the transparent substrate. Accordingly, a precision of less than 5 microns can be achieved for laser alignment to the transparent substrate. This system may also contain alignment marks on the transparent substrate for lens alignment, enabling a precision of less than 5 microns. It is understood that the exemplary embodiments provide the ability to align the lens to the OE device within a 5 micron tolerance. In view of the above, it is possible to directly align the lens to the OE device, using the methods described, to achieve an alignment precision of approximately 5 microns or better.

In various embodiments, the top cable assembly can be held in place with an adhesive, such as epoxy. This can be a semi-permanent attachment, allowing the top cable assembly to be replaced, if necessary. Alternately, the top cable assembly can be held in place with a connector mechanism. The connector mechanism can apply a load (or securing mechanism) to hold the lens in place during operation in an environment with vibration, shock and thermal excursions. In some embodiments, the load can be supplied with a spring supported by a frame, which in turn is attached to the base of the module (either a printed wiring board or ceramic substrate). The spring could also be supported by the metal can. The spring can also be supported against a lid that is attached to the module frame or can wall.

Another option is to pre-weld the lid, without the window installed, to the frame. The bottom lens thickness can be designed such that keying features are on the top side, to project through the frame. Flip chip alignment can be used to bond the lens into the frame with an alloy (one non-limiting example being AuIn) making a hermetic seal. Therefore, the lens would still sit flat on the back of the transparent carrier.

By use of the exemplary system, an optical module can be created with less than 10 mm of overall height. This system can create an optical module that operates in a wide temperature range. One possible embodiment of the exemplary system allows higher temperature ranges by incorporating an active cooling element on the OE (laser) device. The exemplary system enables optical modules to be sealed with traditional methods of welding a lid on a can or newer methods that utilize, for example, atomic layer deposition (ALD).

The two-part lens can have features at a "parting interface" to aid in bringing the two lenses into alignment. The light signals are approximately collimated at the parting interface. This relaxes the alignment in the axis that the light is traveling, accommodating for distances up to 10 mm between these parting surfaces. This allows for transparent substrates, planar on both sides, to be inserted between the two lenses. Also, mechanical alignment lectures can be formed on the two lenses to bring the two lenses into alignment when mated.

The two-part lens can be mated on either side of a window or package window that forms a seal to electronics and the CORE. For example, electronics and the CORE be inside a hermetically-sealed can. The window can have mechanical features, either formed in the window or formed in a second material and attached to the window, that can mate to either or both of the lenses. For example, a frame could have features that bring it into alignment with the fiber cable assembly and this frame could be attached to the window, allowing the fiber cable assembly to then be simply aligned to the frame.

In various embodiments, the window can be welded to the can to form the hermetic seal. The window can be held or adhesively bonded onto the CORE to maintain planarity with the CORE during assembly. This eliminates any tilt and parting of the interface. The fiber cable assembly can then be placed and aligned on the opposite side of the window. The window can be thinner than otherwise necessary due to the support of the CORE. However, for harsh environments, the window should be thick enough to avoid deflections during altitude and temperature extremes that may be experienced.

The exemplary system can have is slightly frosted surface at the parting surfaces of the lens. This frosted surface enhance the ability of a camera to see a "spot" formed by a light at this surface. The laser can be turned on during alignment creating a spot on one parting surface. The fibers can be lit up to create a spot on the second parting surface. A flip-chip bonder can use these spots to bring the two leases into alignment and they can be bonded together. In some instances, a sufficiently illuminated surface without frosting can provide an adequate reference point for alignment. Therefore, it is possible to use the above approach without explicitly frosting any surface. The bonding method may be an adhesive that can be later removed for re-work, for example a silicone-type epoxy.

Another exemplary method of aligning the top cable assembly is to form a keying feature in a window after the CORE has been assembled inside a can with a window. Pattern recognition software driving a short-wavelength laser or other optical device can find features on the CORE, and a laser or mechanical device can etch mechanical keying features into the window. These features can serve at the mating interface to the top cable assembly.

The materials used in the CORE and metal can (or optional support frames and windows) can be chosen to have a matching CTE (within +/−5 ppm/C). Non-limiting examples of materials are GaAs, sapphire, ceramic (including low-temperature co-fired ceramic—LTCC), BK-7, ZnSe, and Kovar. A module constructed of these materials has minimal stresses on the seals in all dimensions (X, Y, and Z), including any stress imparted by the CORE structure in contact with the window (above) and floor of the module (either a ceramic substrate, metal can floor or combination of the two). The following FIGS. are presented to illustrate various non-limiting configurations and benefits of the exemplary embodiments described herein.

FIG. 1 is a cut-away view illustrating an exemplary two-part lens system for providing fiber optic connections to a sealed assembly. The exemplary system contains a top cable assembly 10 with fiber and mating lens, and contains a CORE 14 with OE device and mating lens. The top cable assembly 10 may contain fiber 4 and corner turn optics 6. The corner turn optics 6 contains a lens and a turning surface that can be implemented as separate surfaces or as a single surface as shown here. The corner turn optic 6 functions to couple collimated light 8 into fiber 4 or, in the reverse direction, from fiber 4 into collimated light 8.

The top cable assembly 10 can be formed as a single molded component 2. The CORE 14 is configured with a bottom lens 18 aligned to OE device formed on an OE chip 34. The OE chip 34 can be flip-chip attached and in electrical communication with transparent carrier 20 through contact 32. An optical underfill 30 is applied between the transparent carrier 20 and the OE chip 34. The transparent carrier 20 contains electrical pathways and is in electrical communication with interposer 22 through contact 26. The interposer 22 contains electrical pathway and is in electrical communication with a higher level assembly (not shown). The bottom lens 18 is attached and sealed to the transparent carrier 20. A variety of methods can be used for this attachment, including epoxy or a method of soldering or brazing, for example. The bottom lens 18 and transparent carrier 20 can have metal applied to allow soldering or brazing. In one non-limiting example, this interface could be formed with a combination of gold and indium metals, to form a solder seal of the lens cavity. Another option is a secondary sealant 44 that is applied over the entire CORE structure. One possible example is the atomic layer deposition (ALD) of a ceramic layer, which can be a very thin transparent layer.

Thermally conductive fill 28 can be used to provide a thermal path between OE chip 34 and heat spreader 24. One or more keying features 12 can be formed on the top cable assembly 10 and the CORE 14 to register them at parting interface 16. The keying features 12 can be formed by any desirable method, for example, molding or etching. The keying features can be of any shape, non-limiting examples being V-grooves, U-grooves, pins, cleats, holes, etc. Therefore, while grooving features are shown in FIG. 1, other types are fully contemplated. A male feature can mate to a female feature or both sides can have a female feature with a secondary part, such as a dowel, proving the proud feature on one side. It should be understood that based on the type of keying feature utilized within the various structures. CTE mismatches cart be mitigated between different devices and elements.

As shown in the blown-up detail image at the bottom-right of FIG. 1, the transparent carrier 20 can have alignment features 38 that match OE features 40 on the OE device chip 34. For example, OE feature 40 can be centered between alignment features 38. These features can be used for high accuracy flip-chip alignment and attachment. The transparent carrier 20 can also have alignment features 36 that match features 42 on bottom lens 18. These features (36, 42) can be used the high accuracy flip-chip alignment and attachment. The alignment features 42 on bottom lens 18 can be formed by etching or molding features into bottom lens 18, or by applying a secondary pattern, such a metal, for example, to bottom lens 18. Additionally, the alignment feature 42 may simply be a physical characteristic of the bottom lens 18, for example, the outer edge of the bottom lens 18. The alignment features 36 can be formed on either side of the transparent carrier 20. It should be noted, that in some instances, it is possible to align the bottom lens 18 directly to the OE device chip 34, by centering the OE feature 40 to the features 42 on bottom lens 18.

It is understood that there may be benefits and negatives to each approach. If features 36 are formed on the "lens side" of the transparent carrier 20, they are closer to the same plane as features 42 on bottom lens 18, and may allow more precise alignment. However, this requires precision alignment of features 36 on both sides of the transparent carrier 20, which is difficult in some manufacturing processes, such in glass molding. Notwithstanding the above, the entire structure can be formed in a height less than 10 mm. It should also be noted that the bottom lens 18 may be in a different configuration that as shown in FIG. 1. For example, the bottom lens 18 may be reversed, as needed.

Figure 2:
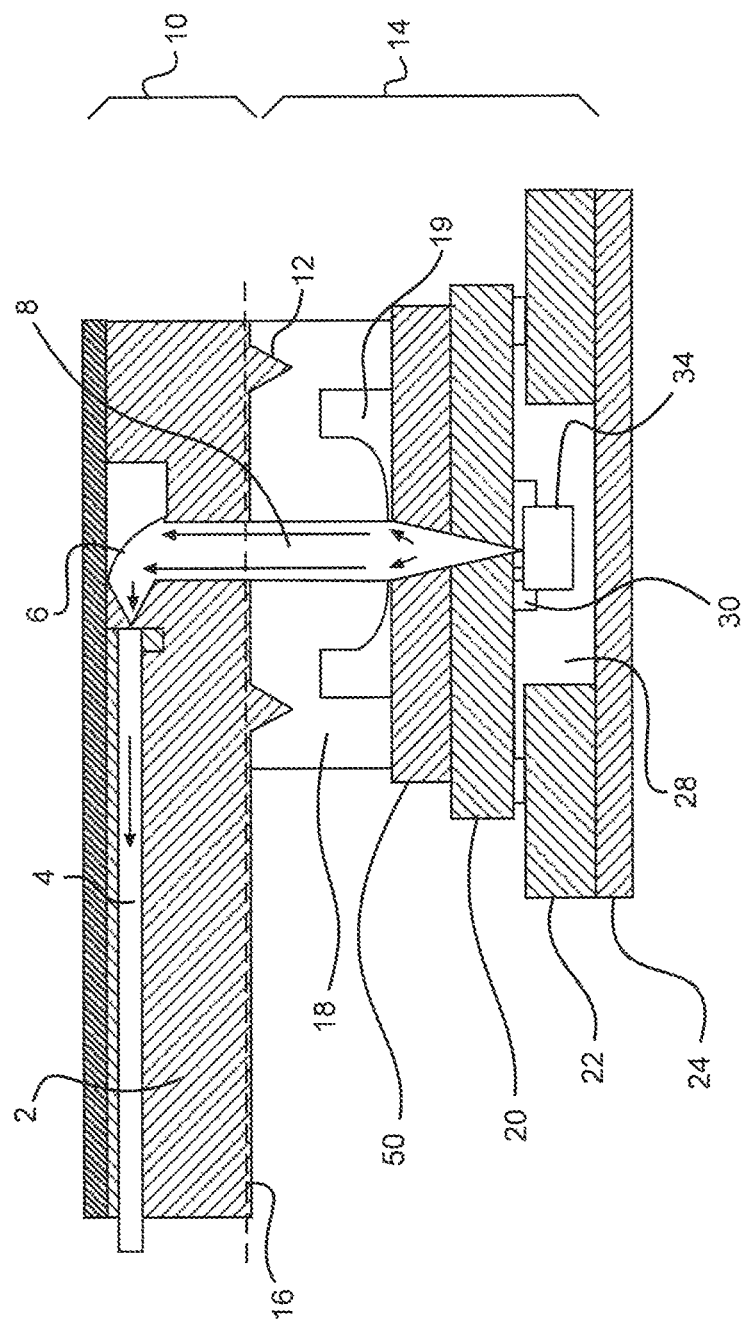
FIG. 2 is a cut-away illustration of an exemplary two-part lens system having a CORE and a top cable assembly, with a transparent spacer between the bottom lens and transparent carrier.

FIG. 2 is a cut-away view illustrating an exemplary two-part lens system for providing fiber optic connections to a sealed assembly, having a transparent spacer 50 between bottom lens 18 and transparent carrier 20. The spacer 50 can seal the lens cavity 19 en bottom lens 18 and provide additional optical path length. The transparent spacer 50 can be formed with a through hole (not shown) in the optical path—in this case, the lens cavity 19 could be sealed during the attachment or the bottom lens 18 and transparent spacer 50 assembly to the transparent carrier 20.

Figure 3:
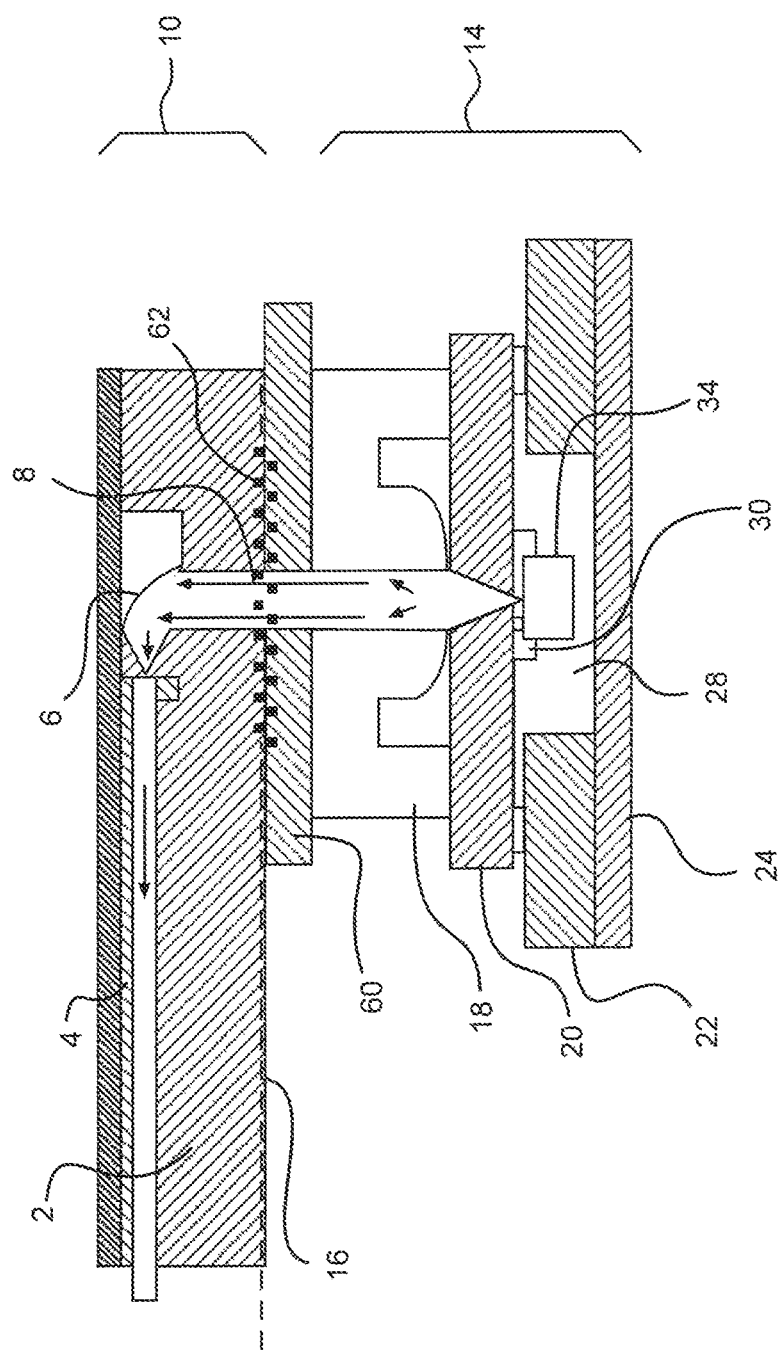
FIG. 3 is a cut-away illustration of an exemplary two-part lens system with a package window between the CORE and top cable assembly.

FIG. 3 is a cut-away view illustrating an exemplary two-part lens system for providing fiber optic connections to a sealed assembly, having a package window 60 at parting surface 16 between top cable assembly 10 and CORE 14. This package window 60 can be the part of a hermetic package that seals the electronic and OE components with a can (with the bottom serving as heat spreader 24) or within a cavity comprising a frame on a ceramic substrate. The package window 60 may be separated from the bottom lens 18 or in contact, depending on the implementation. The top cable assembly 10 can be aligned to CORE 14 with active alignment (monitoring the optical power in the fiber during assembly), semi-active alignment, or passive alignment.

For semi-active alignment, the bottom surface of the top cable assembly 10 and top surface or package window 60 could be frosted 62. Laser light from the OE Chip 34 will produce a spot at frosted surface 62 on the top of package window 60, and light entering the fiber 4 would produce a spot at frosted surface 62 on the bottom of cable assembly 10. A flip-chip bonding process, for example, could align these two frosted spots. The application of a transparent adhesive would mitigate the scattering of light from these frosted surfaces 62, during operation.

For passive alignment, the top cable assembly 10 and CORE 14 (or package window 60) would have features for alignment. These features could be molded into these subcomponents or etched using, for example, a short wavelength laser system outfitted with pattern recognition software. For example, the software could locate features on the transparent carrier 20 and control etching to create features in the package window 60 registered to the features en the transparent carrier 20.

Figure 4:
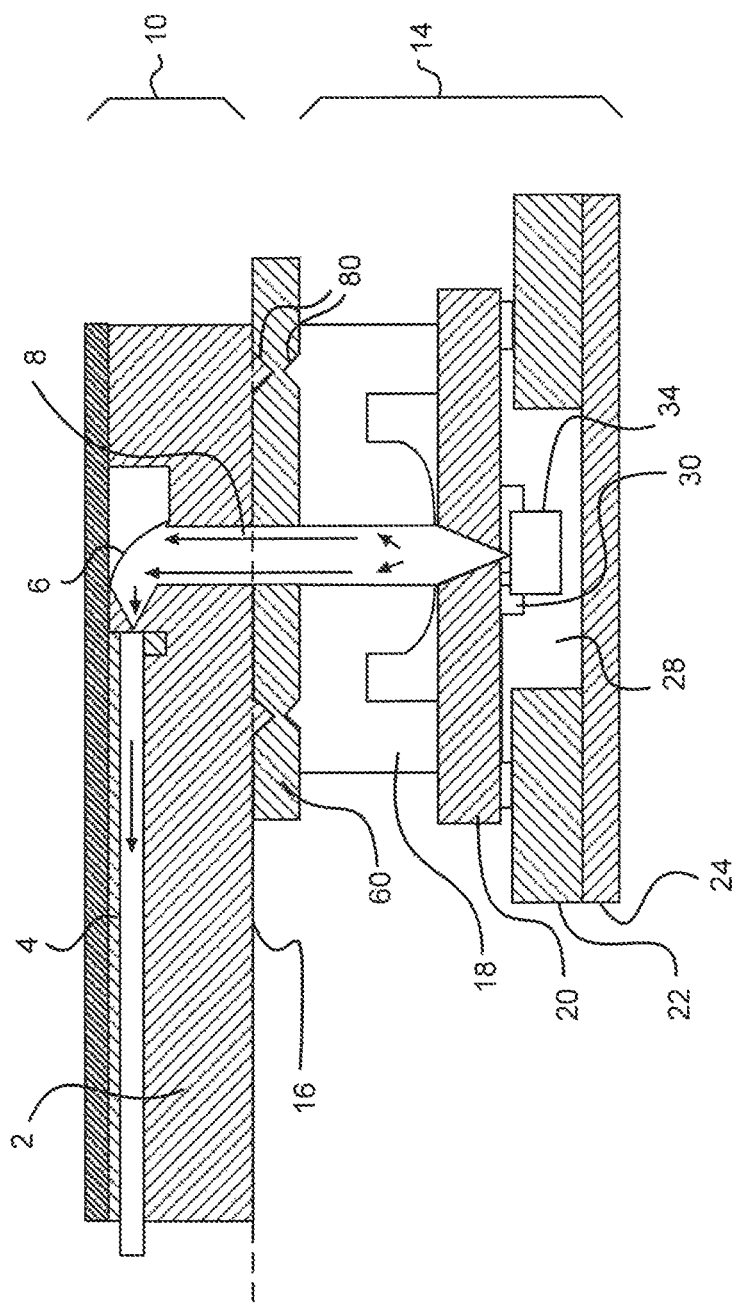
FIG. 4 is a cut-away illustration of an exemplary two-part lens system with a mechanical alignment features in the package window between the CORE and top cable assembly.

FIG. 4 is a cut-away view illustrating an exemplary two-part lens system for providing fiber optic connections to a sealed assembly, having keying features 80 in the package window 60. These keying features 80 would be in registration on both sides of the package window 60. These keying features 80 can be used to align the top cable assembly 10 and the CORE 14, each having complementary keying features.

Figure 5:
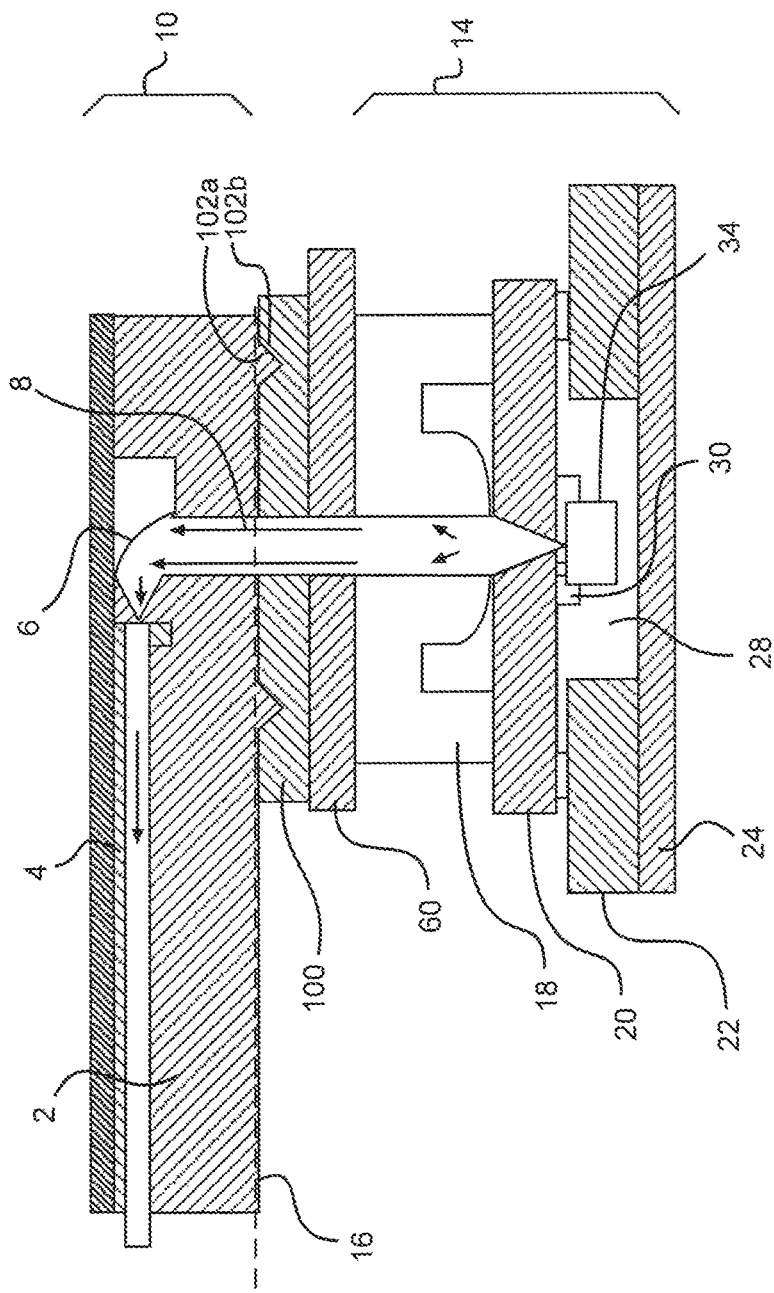
FIG. 5 is a cut-away illustration of an exemplary two-part lens system with an alignment frame attached to the package window between the CORE and top cable assembly, with mechanical keying features for alignment.

FIG. 5 is a cut-away view illustrating an exemplary two-part lens system for providing fiber optic connections to a sealed assembly having an alignment frame 100. This alignment frame 100 has keying features 102b that mate to reciprocal mating features 102a in the top cable assembly 10. Some non-limiting examples of possible keying features are V-grooves, U-grooves, and guide pins/guide holes, etc. The alignment frame 100 can be attached and detached from top cable assembly 10. The top cable assembly 10 with alignment frame 100 can be aligned to CORE 14 using active, semi-active or passive alignment. The alignment frame 100 can be permanently attached to package window 60 or some other supporting portion using an adhesive, for example. In some embodiments, the top cable assembly 10 can then be removably attached and detached to alignment from 100 that is permanently attached to package window 60.

Figure 6:
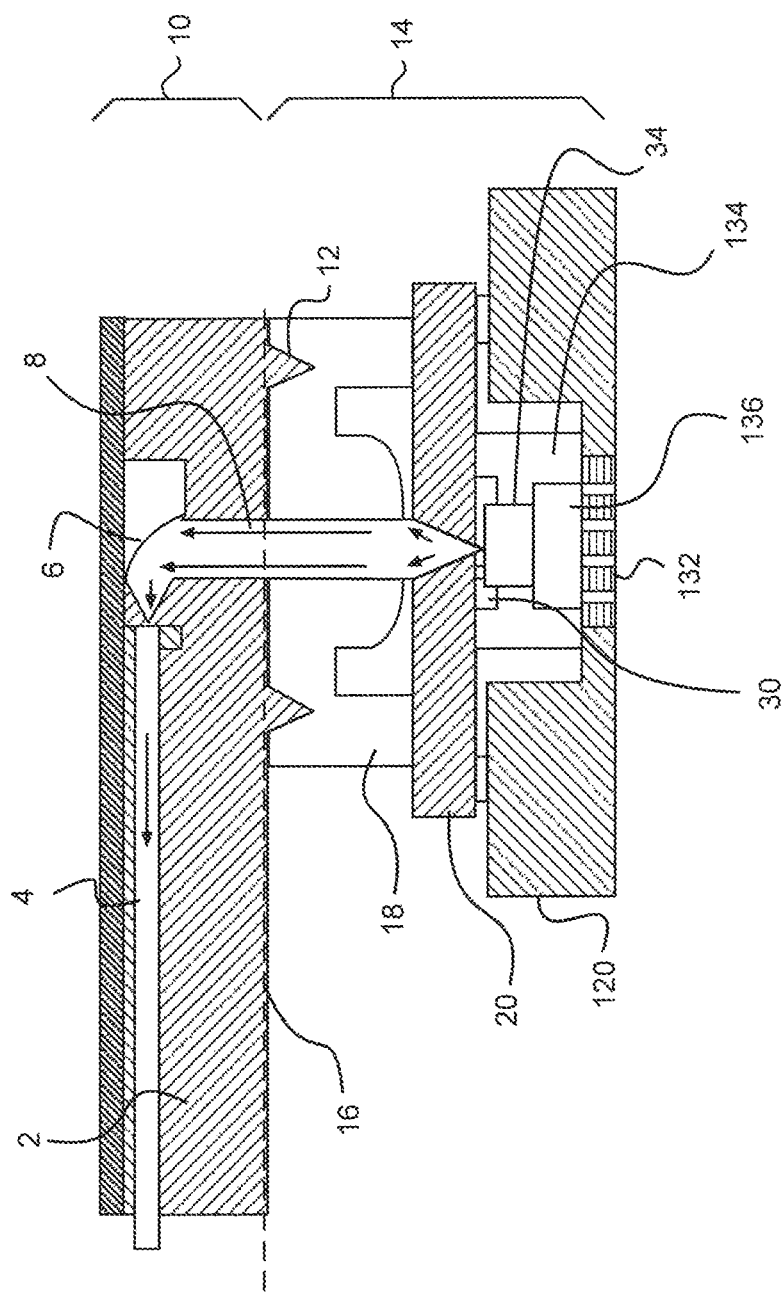
FIG. 6 is a cut-away illustration of an exemplary two-part lens system with the CORE formed on an interposer with thermal vias and optional active cooler.

FIG. 6 is a cut-away view illustrating an exemplary two-part lens system for providing fiber optic connections to a sealed assembly, having an interposer 120 formed of ceramic. For example, a low-temperature co-fired ceramic (LTCC) package will create a ceramic base that is a close CTE match to sapphire, GaAs and Kovar, which are other materials that may be used. The interposer 120 can be formed with a 'pocket' for accepting CORE 14. The bottom of the pocket can have thermal vias 132, which provides an efficient thermal path through interposer 120. The interposer 120 can have a frame soldered (or brazed) to create hermetically sealed cavity (in conjunction with a top lid). As an option to achieve thermal control of OE chip 34, an active cooler 136 can be inserted between OE chip 34 and thermal vias 132. The active cooler 136 could be a Peltier device, if so desired. The active cooler 136 could extend the operational temperature range of OE chip 34. An optionally provided thermally insulating material 134 would aid in reducing the parasitic thermal path around active cooler 136.

Figure 7:
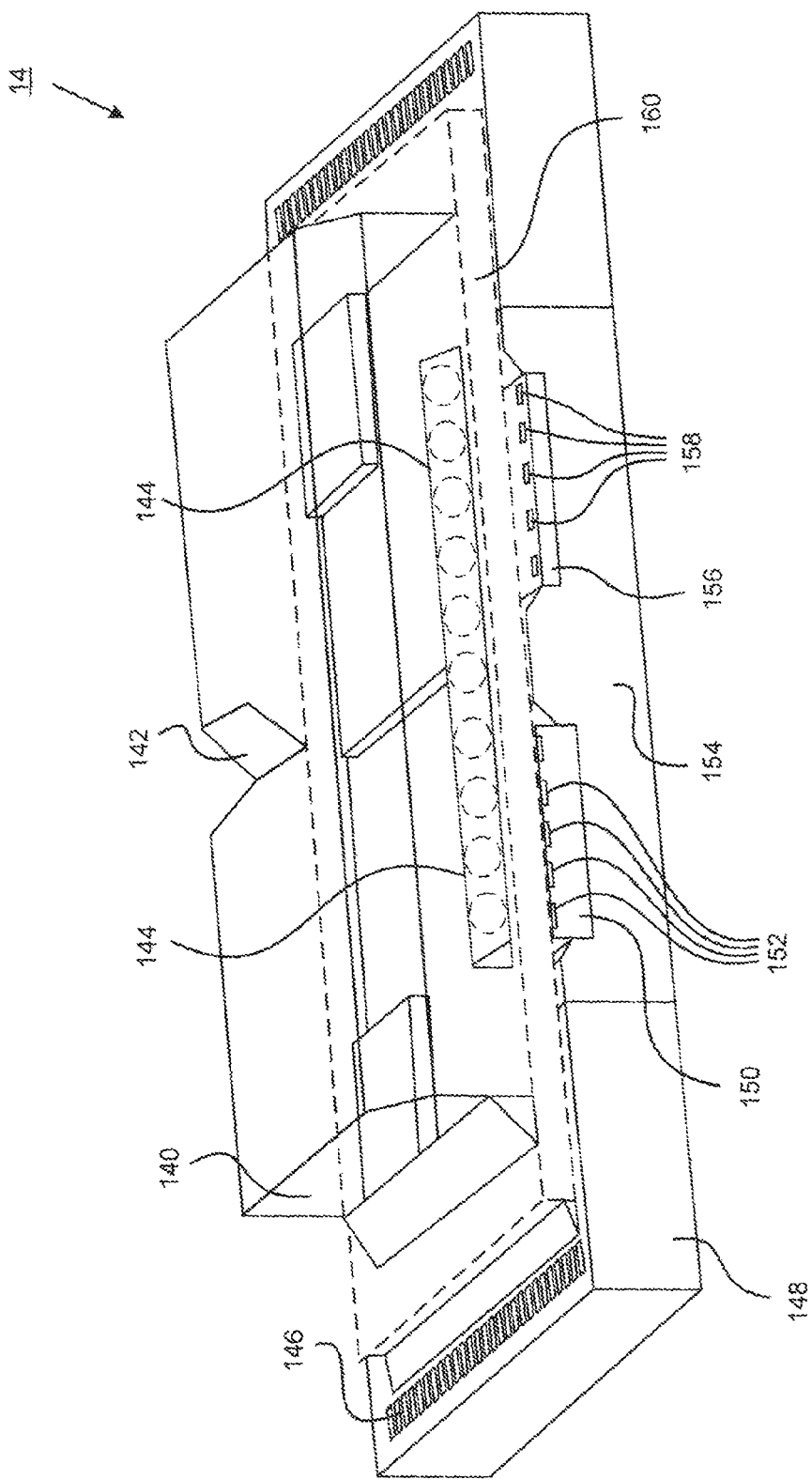
FIG. 7 is a cut-away illustration of an exemplary CORE structure.

FIG. 7 is a cut-away view illustrating a section of an exemplary CORE assembly 14 for use in an exemplary parallel fiber optic module. Multiple fiber optic modules are presented having multiple channels that operate in parallel, utilizing lens arrays 144 and OE device arrays. The detector chip 150 contains an array of detectors 152 and is attached to and in electrical communication with transparent carrier 160. The laser chip 156 contains an array of lasers 158 and is attached to and in electrical communication with transparent carrier 160. The transparent carrier 160 can contain electrical pathways and can have additional circuitry attached or integrated directly into transparent carrier 160. For example, transparent carrier 160 can be formed in silicon-on-sapphire circuitry or can be a transparent substrate with circuits flip-chip attached. The lens substrate 140 can have a collimating lens array 144 formed on one side and keying features 142 on the other side. The lenses and keying features are in registration.

The collimating lens array 144 collimates light from lasers 158 into an array of collimated light paths. Incoming collimated light paths are focused into the detectors 152 by collimating lens array 144. Thermally conductive fill 154 can be used to make an efficient thermal path between the OE devices and the bottom of the CORE 14. The transparent carrier 160 is in electrical communication with interposer 148. The interposer 148 has electrical contacts 146 that are conducive to communicating to a higher level assembly (not shown). Examples of electrical contacts 146 are wire-bond pads, flip-chip pads, solder ball pads or lead-frame pads, and so forth.

Figure 8:
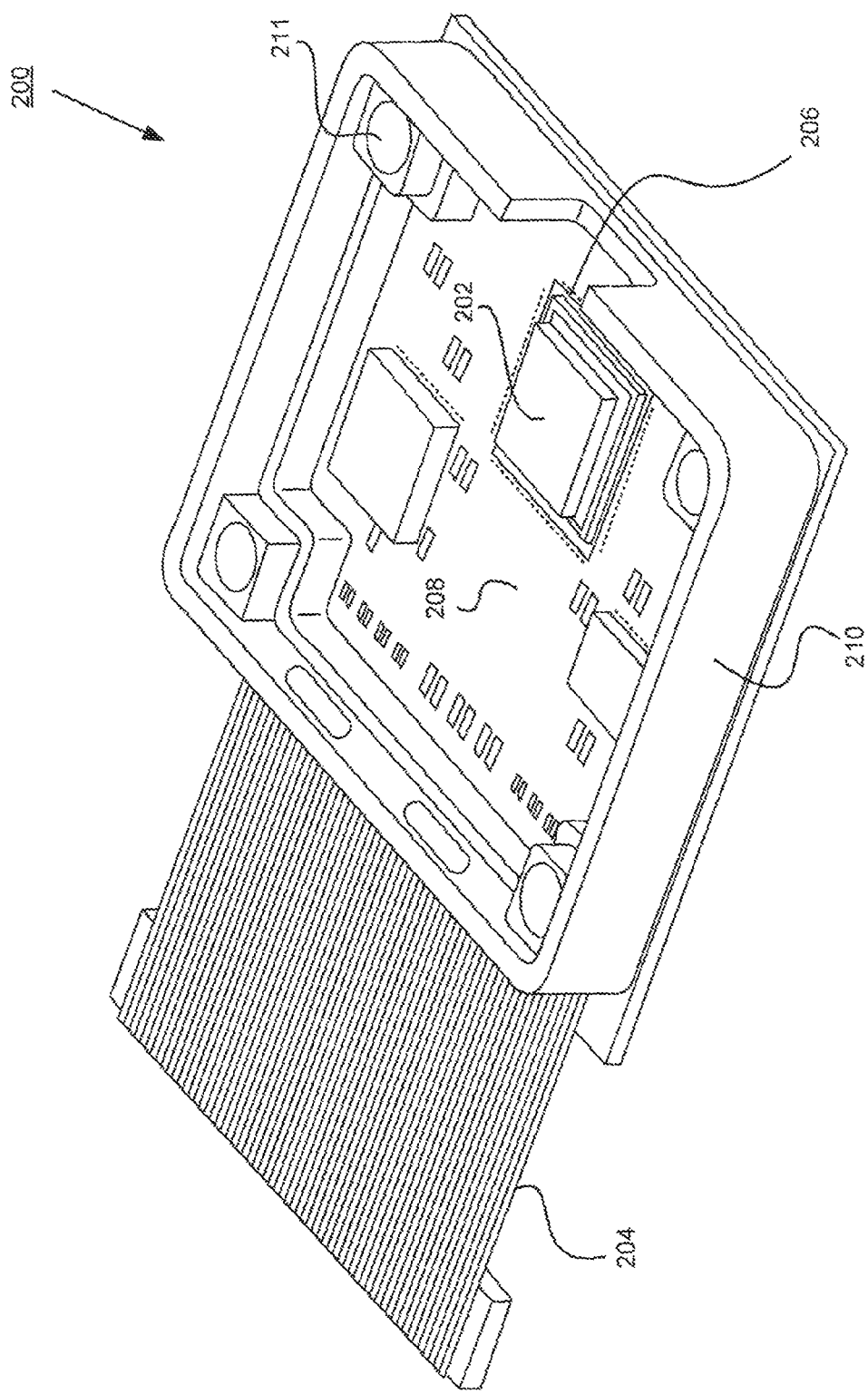
FIG. 8 is an illustration of an exemplary CORE structure assembled into a higher level assembly.

FIG. 8 is an illustration showing an exemplary CORE 202 integrated into a higher level assembly 200. In this example, the CORE 202 is placed within a module printed wiring board (PWB) 208. Ribbon-bonds or wire-bonds 206 make an electrical connection between CORE 202 and module PWB 208. Electrical pin-out 204 is provided to make electrical connections to a higher level assembly (not shown). A module frame 210 is attached to module PWB 208. The module frame 210 can have threaded holes 211 to support any form of lid attachment or spring support.

Figure 9:
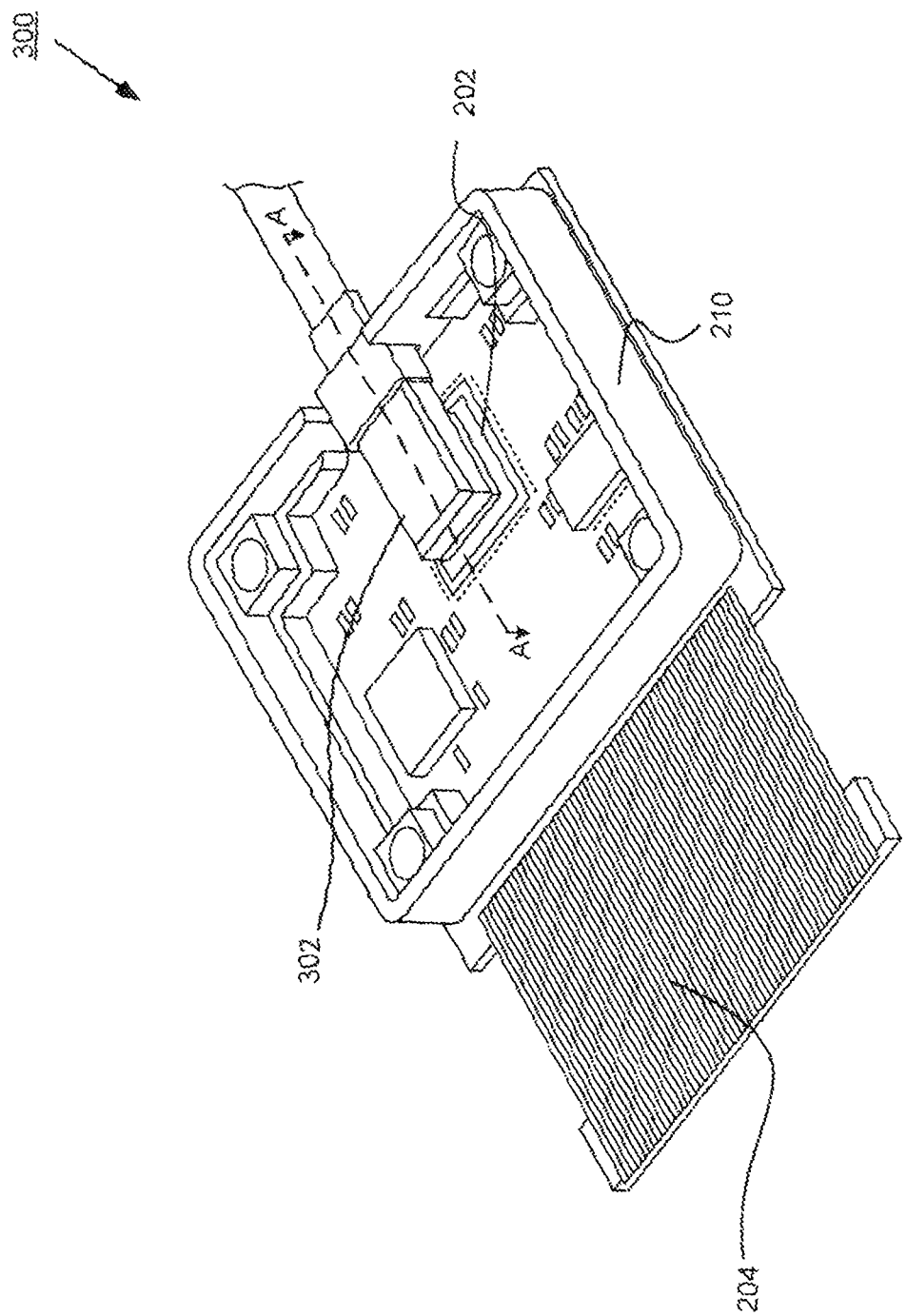
FIG. 9 is an illustration of en exemplary CORE structure assembled into a higher level assembly with the top cable assembly in place.

FIG. 9 is an illustration showing an exposed module assembly 300 with the exemplary top cable assembly attached 302. The top cable assembly 302 is in mechanical contact and aligned to the CORE 202.

Figure 10:
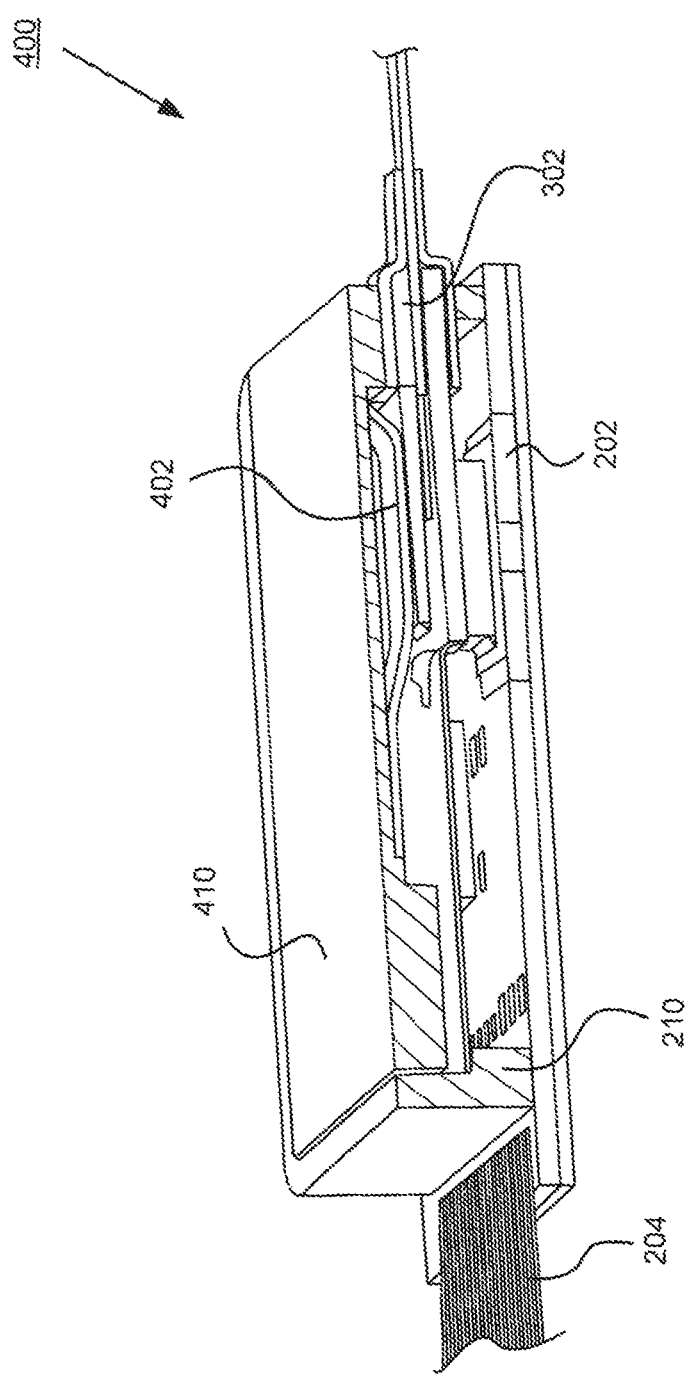
FIG. 10 is a cut-away illustration of an exemplary CORE structure assembled into a higher level assembly with the top cable assembly in place and held with a spring load with supporting lid.

FIG. 10 is a cut-away view along lines A-A of FIG. 9 showing a module assembly 400 with an exemplary top cable assembly 302 and attachment load 402. The load 402 can be supplied, for example, by a spring compressed between the module lid 410 and the top cable assembly 302. The top cable assembly 302 is consequently pressed against the CORE 202 and the module frame 210 supports the lid 410.

Figure 11:
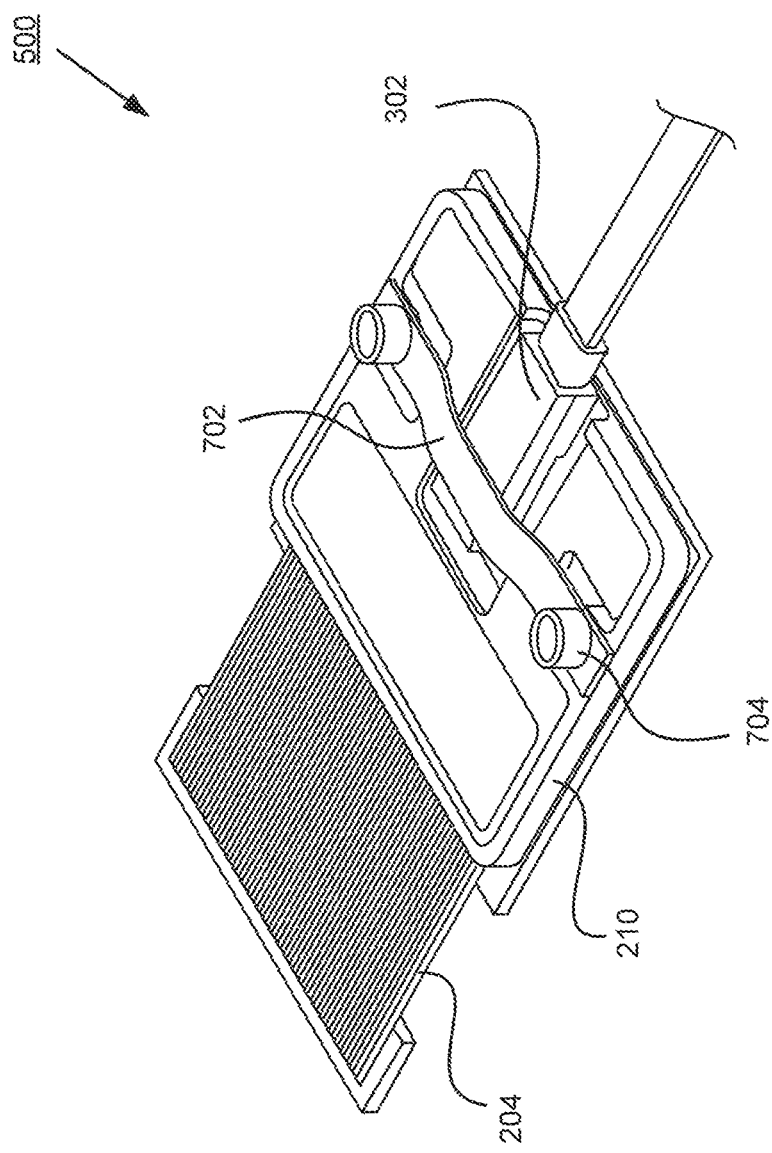
FIG. 11 is an illustration of an exemplary CORE structure assembled into a higher level assembly with the top cable assembly in place and held wilt a spring load attached to a frame for support.

FIG. 11 is an illustration of a module assembly 500 with a top cable assembly 302 held in place by a spring load 702. The spring load 702 includes a spring mounted via tightening screws/pins 704 attached to the module frame 210.

Figure 12:
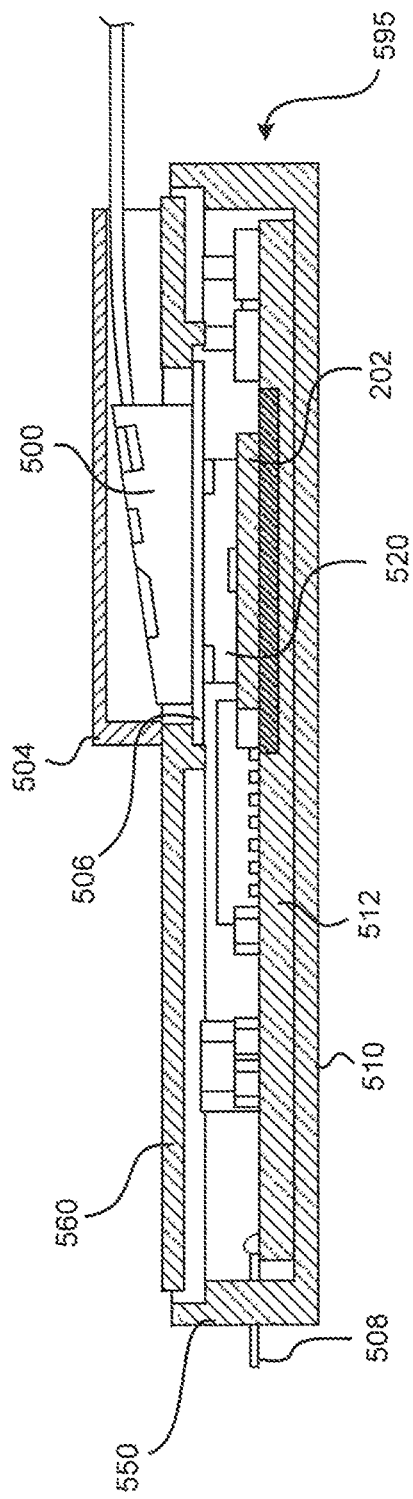
FIG. 12 is a cut-away illustration of an exemplary parallel fiber optic component in a sealed can.

FIG. 12 is a cut-away view illustrating a parallel fiber optic component formed inside a sealed can 595 with the exemplary two-part lens system. The can bottom and sides 550 with top 560 and window 506 function to form a sealed cavity. The lead frame 508 is passed through can wall(s) 550 with a hermetic feedthru and electrically contacts PWB 512. The PWB 512 with CORE 202 are sealed inside the can 595. The can 595 and window 506 form the top of the sealed cavity. Coupled to the can 595 (via window 506) is a ribbon connector 500 which contains an array of fibers and corner turn collimating optics, providing a collimated beam interface. The ribbon connector 500 is aligned to CORE 202 and may be attached to window 506. A dust cover 504 can be provided to give protection to the ribbon connector 500. The can 595, can top 560 and window 596 operate to form a hermetic cavity.

Figure 13:
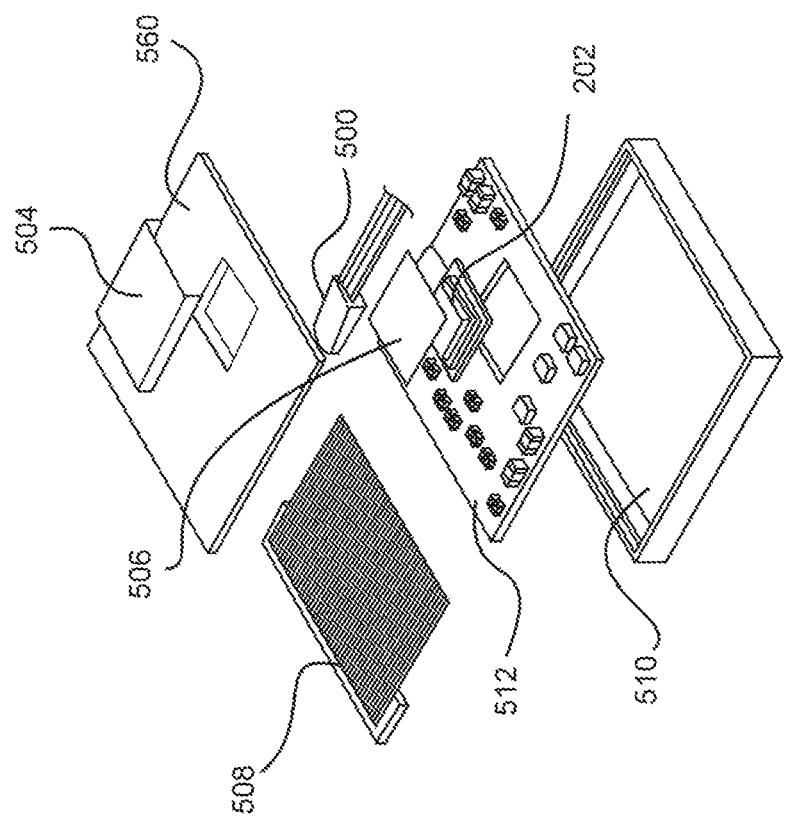
FIG. 13 is an illustration of an exploded view of the components of FIG. 12.

FIG. 13 is an exploded perspective view of the parallel fiber optic component shown in FIG. 12, and is provided to help illustrate a respective layout of the various components, and is understood to be self-explanatory.

Figure 14:
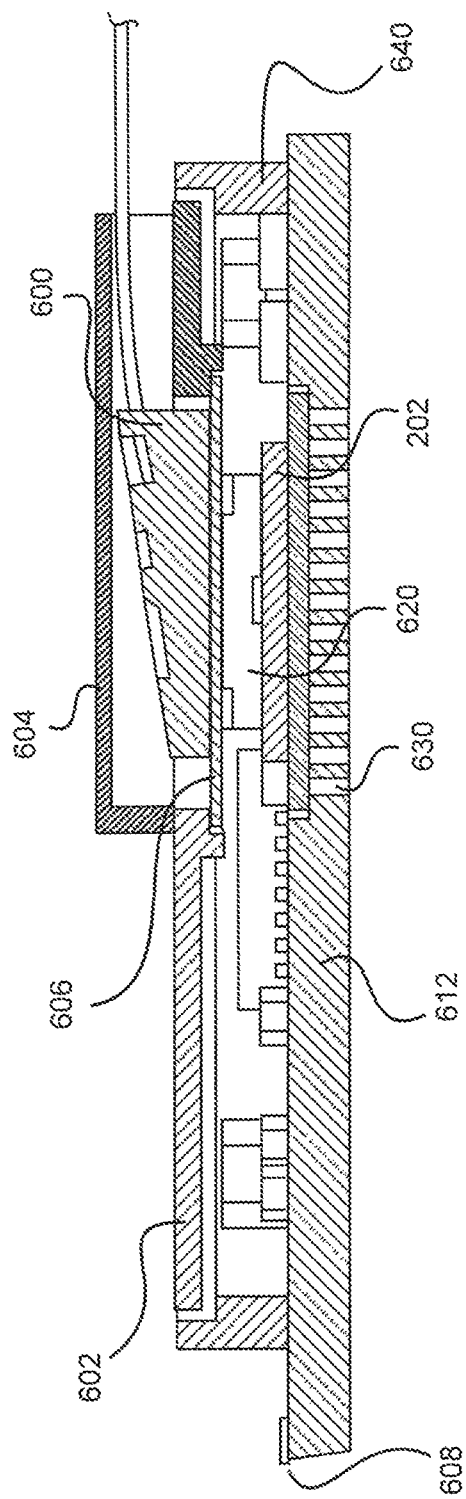
FIG. 14 is a cut-away illustration of an exemplary parallel fiber optic component on a ceramic substrate with a frame and sealed window.

FIG. 14 is a cut-away view illustrating a parallel fiber optic component formed on a ceramic substrate 612, with the exemplary two-part lens system. In this embodiment, lead frame 608 is attached to ceramic substrate 612. The CORE 202 is mounted on thermal vias 630 formed in ceramic substrate 612. A frame 640 is sealed to ceramic substrate 612. A frame lid 602 and window 606 provides the top seal. A ribbon connector 600 is aligned to CORE 202 and attached to window 606. A dustcover 604 is provided to protect the ribbon connector 600. The ceramic substrate 612, frame 640, frame lid 602 and window 606 form a hermetic cavity.

Figure 15:
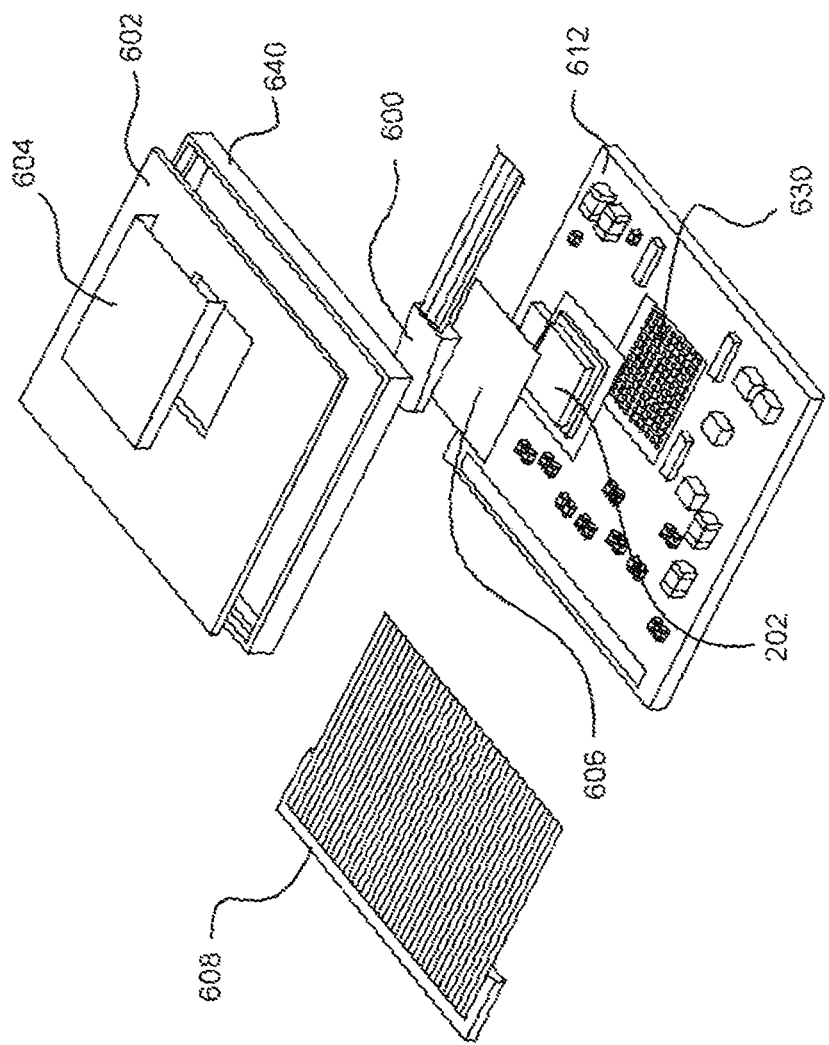
FIG. 15 is an illustration of an exploded view of the components of FIG. 14.

FIG. 15 is an exploded perspective view of the parallel fiber optic component shown in FIG. 14, and is provided to help illustrate a respective layout of the various components, and is understood to be self-explanatory.

The previous description of the disclosed embodiments is provided to enable any person skilled in the art to make or use the present disclosure. Various modifications to these embodiments will be readily apparent to those skilled in the art, and the generic principles defined herein may be applied to other embodiment without departing from the spirit or scope or the disclosure. Thus, the present disclosure is not intended to be limited to the embodiments shown herein but is to be accorded the widest scope consistent with the principles and novel features disclosed herein.

What is claimed is:

1. A method for aligning and maintaining precise alignment of a cable assembly of a fiber optical line to an optical core assembly of an opto-electric (OE) device, comprising:
   fabricating a keying feature at a bottom of the cable assembly having an optical fiber and turning optic moldably fixed therein to provide a light pathway through the bottom of the cable assembly;
   fabricating a mating keying feature at a top of the core assembly, wherein the bottom and top keying features, when mated, align an optical path from the bottom of the cable assembly with an optical path in the core assembly; and
   bonding at least one of a lens alignment feature on a lens in the core assembly and a carrier alignment feature on a transparent carrier disposed between the lens and the OE device, wherein the lens and carrier alignment features, when aligned, align an optical path in the lens to the OE device.

2. The method of claim 1, wherein the bonding of the alignment features is accomplished via a flip-chip bonding process.

3. The method of claim 1, wherein the optical path in the cable assembly is bent approximately 90 degrees in the cable assembly.

4. The method of claim 1, wherein the lens alignment feature is bonded to a bottom of the lens.

5. The method of claim 1, wherein the carrier alignment feature is bonded to a bottom of the transparent carrier.

6. The method of claim 1, wherein the keying features, when mated, allow an alignment error of up to 25 microns.

7. The method of claim 1, wherein the alignment features, when aligned, allow an alignment error of up to 5 microns.

8. The method of claim 1, further comprising, removably attaching the cable assembly to the core assembly.

9. The method of claim 1, further comprising, disposing, a transparent spacer between the lens and the transparent carrier.

10. The method of claim 1, further comprising, fabricating, thermal vias below the OE device, to assist in cooling the OE device.

11. The method of claim 1, further comprising, disposing, an active cooler proximal to the OE device, to assist in tooling the OE device.

12. The method of claim 1, further comprising, sealing the core assembly in a hermetic can.

13. An optical core assembly adapted to precisely match an optical cable assembly, comprising:
   a collimating lens configured with a keying feature at a top of the lens and a bottom-alignment feature at a bottom of the lens, the keying feature capable of being matched to a mating keying feature in a bottom of the cable assembly to fix an optical path in the cable assembly to the lens, the cable assembly having an optical fiber and turning optic moldably fixed therein to provide a light pathway through the bottom of the cable assembly;
   a transparent carrier with carrier-alignment features, disposed below the lens; and
   an opto-electric (OE) device disposed below the transparent carrier, wherein the bottom- and carrier-alignment features provide alignment of the optical path to the OE device.

14. The device of claim 13, further comprising, a corner turn optics in the cable assembly.

15. The device of claim 13, wherein the keying features, when mated, when mated, allow an alignment error of up to 25 microns.

16. The device of claim 13, wherein the bottom- and carrier-alignment features, when aligned, when mated, allow an alignment error of up to 5 microns.

17. An optical core assembly adapted to precisely match an optical cable assembly, comprising:
   an alignment frame with a keying feature disposed below the cable assembly, the cable assembly having an optical fiber and turning optic moldably fixed therein to provide a light pathway through the bottom of the cable assembly;
   a mating keying feature at a bottom of the cable assembly;
   a package window disposed below the alignment frame;
   a lens and transparent carrier disposed below the package window; and
   an opto-electric (OE) device disposed below the transparent carrier, wherein the keying feature and mating keying feature, when mated, align an optical path in the cable assembly into the OE device.

18. The device of claim 17, further comprising, a can with a sealed lid disposed about the core assembly.

19. The device of claim 17, limiter comprising thermal vies below the OE device, to assist in cooling the OE device.

20. The device of claim 17, further comprising, an active cooler proximal to the OE device, to assist in cooling the OE device.

21. The device of claim 17, further comprising, a securing member disposed above and in contact with the cable assembly.

22. The device of claim 21, wherein the securing member is a spring.

23. The device of claim 17, further comprising, a corner turn optics in the cable assembly.

24. A method for aligning and maintaining precise alignment of a cable assembly of a fiber optical line to an optical core assembly of an opto-electric (OE) device, comprising:
   fabricating a keying feature at a bottom of the cable assembly, the cable assembly having an optical fiber and turning optic moldably fixed therein to provide a light pathway through the bottom of the cable assembly;
   fabricating a mating keying feature at a top of the core assembly, wherein the bottom and top keying features, when mated, align an optical path in the bottom of the cable assembly with an optical path in the core assembly;
   bonding at least one lens alignment feature on a lens in the core assembly; and
   aligning the OE device with the lens alignment features to align an optical path in the lens to the OE device.

* * * * *